United States Patent [19]
Harrison et al.

[11] 3,788,555
[45] Jan. 29, 1974

[54] APPARATUS FOR PROJECTING PLURAL COMPONENT MATERIAL UPON A SUITABLE BASE

[75] Inventors: David Harrison, Fort Lauderdale; Paul R. Sainz, Miami, both of Fla.

[73] Assignee: Ransburg Electro Coating Corp., Indianapolis, Ind.

[22] Filed: May 1, 1972

[21] Appl. No.: 248,968

Related U.S. Application Data
[62] Division of Ser. No. 32,064, April 27, 1970, Pat. No. 3,676,197.

[52] U.S. Cl. .................. 239/336, 239/420, 239/422
[51] Int. Cl. .............................................. B05b 7/14
[58] Field of Search .................... 239/336, 420, 422

[56] References Cited
UNITED STATES PATENTS

| | | | |
|---|---|---|---|
| 3,096,225 | 7/1963 | Carr et al. | 239/336 |
| 1,881,345 | 10/1932 | Beatty et al. | 239/336 |
| 3,258,207 | 6/1966 | Cody | 239/422 |
| 3,606,154 | 9/1971 | Tufts | 239/420 |
| 3,033,472 | 5/1962 | Shelton | 239/336 |
| 3,111,272 | 11/1963 | Underdown et al. | 239/336 |
| 3,399,834 | 9/1968 | Bradley | 239/336 |

*Primary Examiner*—Lloyd L. King
*Attorney, Agent, or Firm*—Merrill N. Johnson et al.

[57] ABSTRACT

An apparatus for and a method of providing a mixed spray of a plural component material and curing agent with granular material entrained in the mixed spray. The apparatus includes curing agent spray means, outboard plural component material spray means flanking the curing agent spray means and granular material dispensing or emitting means. The outboard spray means includes a plurality of spaced apart spray nozzle means inclined toward each other so as to provide converging sprays of the plural component material. The sprays are adapted to converge and intersect externally of the apparatus prior to deposition upon a surface. The curing agent spray means provides a spray of curing agent which intersects and mixes with the sprays of the plural component material. Granular material entrained in a fluid medium mixes with the sprays of plural component materials so as to provide a mixed spray of plural component material and curing agent with granular material entrained therein.

4 Claims, 5 Drawing Figures

PATENTED JAN 29 1974
3,788,555
SHEET 2 OF 2
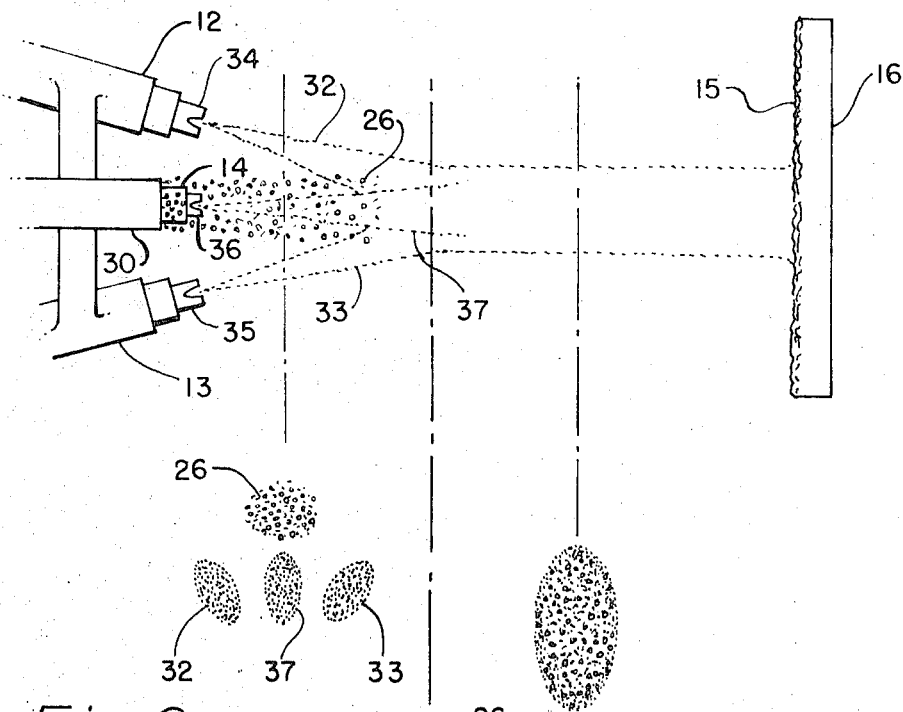
Fig. 2
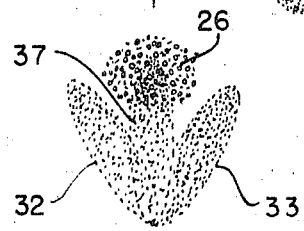
Fig. 2a
Fig. 2b
Fig. 2c

APPARATUS FOR PROJECTING PLURAL COMPONENT MATERIAL UPON A SUITABLE BASE

This is a division, of Application Ser. No. 32,064, filed Apr. 27, 1970, now U.S. Pat. No. 3,676,197.

The present invention relates to an apparatus for and a method of providing a spray including a plural component material with entrained filler material. More particularly, the present invention relates to an apparatus for and a method of providing a commingled spray including a plural component material with filler or granular material wetted by the plural component material prior to deposition.

Plural component materials generally have good adhesion and weathering qualities. Therefore, it is feasible to use the plural component materials to provide weather resistant coatings upon a myriad of surfaces such as wood, paperboard, plasterboard polyester based materials, cement based or cement impregnated paper materials and masonry exterior surfaces including but not limited to brick, cement and stone. However, in order to reduce the cost of the coating, to reduce the weight of the coating, and to provide a surface with a coating having a variable surface contour and various colors, it is desirable to mix with the plural component material a granular material such as perlite, clay, sand, talc, mica, calcium carbonate, calcium silicate, glass beads, plastic spheres and the like.

Plural component materials which may be sprayed concurrently with granular materials include polyester resins, epoxy resins, urethane resins, silicone rubber and the like. Generally, the plural component material is converted, at ambient atmospheric temperature, from a liquid phase to a solid phase by the addition of an appropriate curing agent. Polyester resins may be cured by the addition of a peroxide catalyst and a naphthenate or aniline promoter. Epoxies may be cured by the addition of a suitable amine or anhydride curing agent thereto. Urethanes may be obtained by the addition of a suitable isocyanate ester to a polyester resin. Silicone rubber may be obtained by the addition of a suitable tin soap to a silicone elastomer.

The addition of the curing agent to the plural component material is usually made just prior to use to thereby initiate curing of the plural component material. Generally, the curing cycle of the plural component material is of short duration. For example, upon the addition of both a catalyst and a promoter, polyester resin may solidify in a matter of 45 minutes or less. Although the polyester resin may be inhibited against curing, the resultant solid plastic of an inhibited polyester resin tends to suffer from an undesirable loss in physical properties, such as physical strength. Therefore, a limited time is available for the application of a polyester resin mixed with promoter and catalyst to a surface to be coated before solidification of the mixture. If the mixed materials are not applied to the surface to be coated within the limited period of time, the materials may be of little use thereafter and in any event cannot be sprayed through a spray device. The application of the catalyzed polyester resin to a surface using hand application techniques is extremely difficult and may result in an undesirable waste of material due to solidification of the resin.

In order to reduce the amount of waste of the plural component material over hand application techniques, several methods of continuously blending the resin with the catalyst and promoter are suggested. In one suggested method, the polyester resin is divided into two substantially equal amounts or batches. One batch contains polyester resin and promoter whereas the other batch contains polyester resin and catalyst. An amount of polyester resin and promoter is sprayed into a spray of polyester resin and catalyst. Usually, a dual head spray gun is used to provide sprays which converge prior to impinging or contacting the surface to be coated. It is also proposed that a center means introduce an entrained granular material into the sprays of the plural component material prior to the deposition of such sprays upon the surface to be coated to thereby provide that surface with a coating having variable surface contour. One of the drawbacks of the dual head spray gun with a centrally located means emitting granular material is that in order to transport the granular material to the surface to be coated, the forward velocity of the granular material is so great that the granules are not substantially uniformly mixed with the intersecting outboard sprays and the granules tend to rebound from the surface to be coated. However, when the forward velocity of the granules is reduced to minimize rebounding from the surface to be coated, many of the granules tend to separate from the spray and drop to the ground or floor and are, therefore, wasted. It is seen that the forward velocity of the granules is important and difficult to control in a dual head spray gun with a centrally located means emitting entrained granular material. Furthermore, the dual head spray device with a centrally located nozzle emitting granular material experiences some difficulty in adequately wetting the granular material prior to deposition on the surface to be coated.

Although the mixing of the spray of plural component and promoter with the spray of plural component material and catalyst with granular material entrained in air just prior to deposition upon a surface to be coated is an improvement over the batch mixing of the plural component material and granular material, nevertheless, the mixed batches tend to solidify in about a few hours to several days depending on the type of catalyst used in the absence of a promoter. Thus, while this so-called "two-pot" system reduces waste, it does not entirely eliminate it.

U.S. Pat. No. 3,399,834 shows an apparatus for and a method of depositing commingled sprays of promoted polyester and catalyst wherein a spray of the catalyst is mixed with sprays of promoted polyester externally of the spray apparatus using a plurality of converging sprays to thereby overcome several of the problems mentioned above. Prior to deposition upon a surface to be coated, the mixed spray has chopped lengths of glass fibers mixed therewith. The chopped lengths of glass fibers are used to enhance the mechanical and the physical properties of the polyester resin.

The present invention relates to an apparatus for and a method of mixing granular material entrained in a fluid medium with sprays of a plural component material and a curing agent and depositing the resultant mixture upon a surface of an article. The thus deposited materials provide the article with a coating having a variable surface contour and, if desired, various single or multiple colors. The entrained granular material is fed into the sprays of plural component material from a location or site above such sprays and in such a manner and at such forward velocity that the entrained granular material is substantially uniformly mixed with and adequately wetted by contact with the plural component spray prior to contact with the article surface. Furthermore, little, if any, of the granular material appears to drop to the ground or floor prior to contacting the surface to be coated. In addition, the substantially uniform mixing of the entrained granular material with the sprays of plural component material appears to substantially uniformly distribute the granular material in the deposited spray pattern. Wetting of the granular material in the spray appears to provide a more advantageous bond between the surface of the granular material and the plural component material. In addition mixing the granular material with the promoted and catalyzed resin spray externally of the spray apparatus rather than internally of the spray apparatus substantially reduces wear experienced by the spray apparatus which may be brought about by the abrasive character of some granular materials.

It is, therefore, an object of the present invention to provide an apparatus for and a method of externally mixing or commingling entrained granular material with sprays of plural component material prior to depositing the sprays upon an article surface. Another object of the present invention is to provide an apparatus for and a method of wetting and substantially uniformly mixing granular material with a plural component material exteriorly of a spray apparatus and prior to engagement of such materials with and deposition on the surface of an article. Other objects of the present invention will become apparent from a reading of the specification, claims and the drawings.

In the drawing:

FIG. 2 is a diagrammatic view showing the spray pattern of the apparatus of the present invention.

Figure 1:
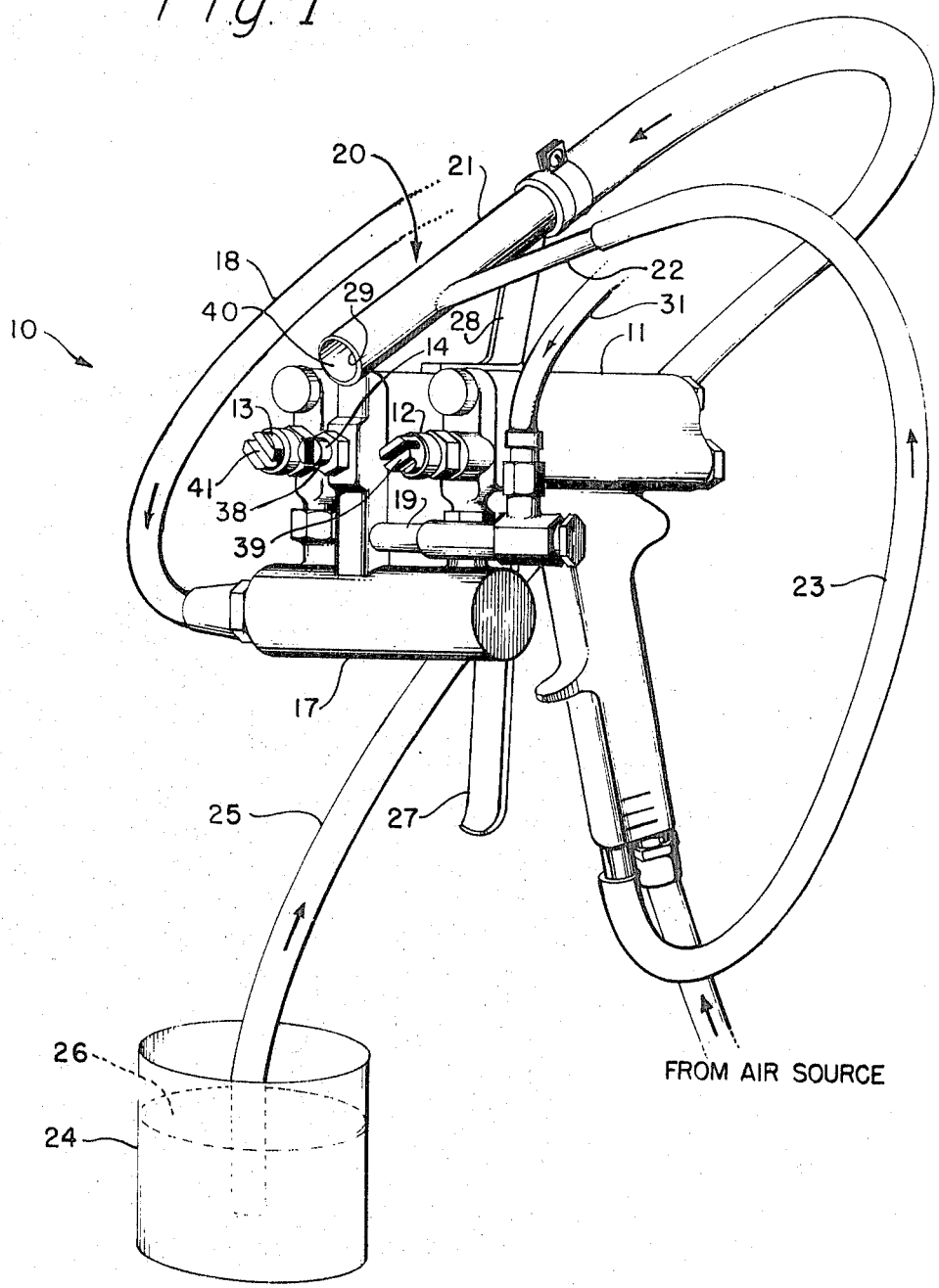
FIG. 1 is a perspective view of the present invention.

Generally speaking, the present invention relates to an apparatus for and a method of providing mixed or commingled sprays of a plural component material with granular material. The apparatus includes means for blending a mixture of a plural component material with a curing agent and with entrained granular material by projecting a plurality of converging sprays of the plural component material from spaced apart sites, projecting a spray of curing agent into the sprays of the plural component material from a site between the sites of the sprays of the plural component material and projecting granular material entrained in a fluid from a site above the sprays.

Referring now to FIG. 1 of the drawing, the spray apparatus of the present invention is indicated by the reference numeral 10. The spray apparatus 10 includes housing or support means 11, pivotally mounted outboard spray means 12 and 13 and centrally located curing agent spray means 14 positioned between the outboard spray means 12 and 13. Note that the curing agent spray means is substantially on the same horizontal plane as are the outboard spray means 12 and 13. The housing 11 serves as the main support member for the outboard spray means 12 and 13 and for the curing agent spray means 14.

The spray apparatus is used to spray the surface 15 of an article 16, as shown in FIG. 2, with a suitable plural component material such as a polyester resin, an epoxy resin, a urethane, a silicone rubber and the like. Surface 15 of article 16 may be of any suitable material compatible with the plural component material and as wood, paperboard, plasterboard, polyester base materials, cement base or cement impregnated materials and masonry including but not limited to brick, cement and stone. The curing agent spray means 14 may provide a spray of organic peroxide catalyst where the outboard spray means 12 and 13 are spraying a promoted polyester resin or a spray of suitable amine or anhydride where the outboard spray means are spraying an epoxy resin.

Each of the pivotally mounted outboard spray means 12 and 13 are suitably connected through plural component material manifold 17 and conduit 18 to a source (not shown) of a suitable plural component material. The plural component material may be supplied under pressures of up to about 80 psi to the outboard spray means 12 and 13 by a suitable air-operated 4:1 ratio pump (not shown). Using the apparatus 10 shown in FIG. 1, the plural component material is atomized by the interaction of hydraulic force with the surrounding air upon emerging from the orifices of the outboard spray means 12 and 13. It should be understood that the plural component material may be atomized by any other suitable mechanical means such as by air and the like. However, for the purpose of illustration and not for the purpose of limitation the outboard spray means 12 and 13 are illustrated as including nozzles 39 and 41 respectively which hydraulically atomize the plural component material. For the purpose of illustration and not for the purpose of limitation, the curing agent spray means 14 is illustrated as being an airless or hydraulic spray means.

In order to accommodate materials of different color, a second conduit (not shown) may be connected to the side of manifold 17 opposite to the side thereof to which conduit 18 is connected. A valve (not shown) may be carried by the manifold for appropriately controlling the flow rate of the different colored materials through the manifold. It should be noted that each of the different colored materials are dispensed from different nozzles and are, therefore, mixed externally of the spray apparatus rather than internally thereof.

The centrally located curing agent spray means 14 is flanked by and on substantially the same horizontal plane with the pivotally mounted outboard spray means 12 and 13. The curing agent spray means 14 is connected to a suitable source (not shown) of curing agent through curing agent manifold 19 and conduit 31. A suitable curing agent for a promoted polyester is a peroxide catalyst such as methyl ethyl ketone peroxide, benzoyl peroxide and the like. A suitable curing agent for an epoxy is an amine or anhydride. Urethanes may be obtained by the addition of a suitable isocyanate ester to a polyester resin. Silicone rubber may be obtained by the addition of a suitable tin soap to a silicone elastomer.

The outboard spray means 12 and 13 are angled or inclined toward each other in such a manner that the spray pattern provided by each of the outboard spray means converge and intersect at a locus spaced about 5 or more inches from the front of the spray apparatus 10.

The curing agent spray means 14 includes a fluid spray nozzle 38 positioned so as to provide a spray of curing agent which intersects the converging fluid sprays of the outboard means at the locus between the intersecting sprays issuing from each of the outboard spray 12 and 13. The vertical width of the spray pattern of the curing agent as it intersects the sprays of the outboard spray means 12 and 13 is preferably substantially the same as the vertical width of the sprays of the plural component material to assure substantially uniform mixing of the curing agent with the plural component material.

In order to provide a spray of substantially uniformly mixed or commingled plural component material and curing agent, it is important that the curing agent spray means 14 be approximately centrally located between the outboard spray means 12 and 13. The outboard spray means 12 and 13, when dispensing a polyester resin, dispenses up to about 99.5 weight percent of the total weight of the fluid component of the spray issuing from apparatus 10. The outboard spray means 12 and 13 dispense approximately 50 weight percent of the total weight of the fluid component when dispensing a urethane. The remainder of the fluid component of the spray issuing from the spray means 10 is dispensed by the curing agent spray means 14. It should be appreciated that if the curing agent spray means 14 were located at a position other than that shown in FIG. 1, the curing agent might not be substantially uniformly mixed with the plural component because of the disportionate amount of plural component as compared to catalyst dispensed by the apparatus 10. Further, in an apparatus where the curing agent spray means 14 is not centrally located, an undesirable deflection in the resulting spray might result.

Spaced from and positioned above the centrally located curing agent spray means 14 is granular material emitting means 20. The granular emitting means may be suitably pivotally mounted upon housing 11 by bracket 28. The granular material emitting means 20 includes an elongated, substantially tubular main body portion 21 and an elongated tubular branch portion 22. The bore 29 of main body portion 21 and the bore (not shown) of the branch portion 22 of the granular material emitting means 20 are substantially smooth and may be fabricated from any suitable wear resistant material such as metal, plastic or the like. The axis of the bore of the branch portion 22 intersects the axis of the bore 29 of the main body portion 21 of the granular material emitting means 20 at an acute angle. The acute angle of intersection of the bores is about 30°–80° and preferably 30°–60°. The acute angle should be of sufficient angular magnitude to cause an area of reduced pressure to exist rearwardly of the junction between the bore 29 of the main body portion 21 and the bore of the branch portion 22 of granular material emitting means 20 during operation of the spray apparatus 10. The side wall of the branch portion 22 of the granular material emitting means may be substantially flush with or projecting slightly beyond the side wall of bore 29 into bore 29. One end of the bore of the branch portion 22 of the granular material emitting means 20 is connected to a suitable source (not shown) of fluid under pressure such as clean, dry air or the like through conduit 23. As shown in FIG. 1, one end of the tubular main body portion 20 of the granular emitting means 20 is connected to granular material reservoir 24 through conduit 25.

Granular material 29, contained within reservoir 24, may be any suitable material which can be entrained in air by using a suction device, by using a suitable fluidized bed (not shown) or by using any other suitable granular material conveying means. Suitable granular material includes perlite, clay, sand, talc, mica, calcium carbonate, calcium silicate, glass beads, plastic spheres and the like.

It is seen that a suitable fluid under pressure such as air flowing through hose 23 and the bore of branch portion 22 of the granular emitting means 20 into the bore 29 of the main body portion 21 provides a reduced pressure in the area rearwardly of the junction between the main body portion 21 and the branch portion 22. A reduced pressure is thereby provided in conduit 25 which extends to reservoir 24. The reduced pressure existing in hose 25 tends to cause granular material 26 to be withdrawn from reservoir 24 entrained in air and carried through hose 25 to the main body portion 21 of granular material emitting means 20. Air flowing from the fluid source (not shown) through conduit 23 into the main body portion 21 of granular emitting means 20 appears to assist in dispensing the entrained granular material 26 from orifice 40 of the granular emitting means 20. The orifice 40 of the granular emitting means 20 may have a circular, elliptical or any other suitable cross sectional shape. Orifice 40, as illustrated in FIG. 1, is shown to be circular in cross section and has an inside diameter of about 0.5 inch. The length of the bore 29 is about 6 inches. The width of the bore of the branch portion 22 is about 0.25 inch and the length of the bore is about 4 inches.

The angle at which the granular material 26 intersects the sprays of the plural component material should be such that the granular material is adequately wetted by and substantially uniformly mixed with the plural component material prior to deposition upon surface 15 of article 16. Locating the axis of orifice 40 of the granular emitting means 20 about 1 to 6 inches and preferably 1 to 2 inches above a horizontal plane determined by axes of the orifices of the outboard spray means 12 and 13 and curing agent spray means 14 so as to introduce the granular material in the spray of plural component material at about 2 inches in front of the spray apparatus 10 to about the point where the converging outboard sprays intersect appears to result in good wetting and substantially uniform mixing of the granular material 26 with the sprays of the plural component material.

Depression of trigger means 27 of spray apparatus 10 causes granular material 26 to be drawn by suction through hose 25 from reservoir 24 and dispensed from granular emitting means 20. Further depression of trigger means 27 substantially simultaneously actuates the flow of plural component material from spray means 12 and 13 and the flow of curing agent from spray means 14 of apparatus 10. Release of the depressed trigger 27 will first substantially simultaneously terminate the flow of plural component material from spray means 12 and 13, the flow of curing agent from spray means 14 of apparatus 10 and then terminate the flow of granular material 26 from granular emitting means 20.

As shown in FIG. 2, the converging spray streams 23 and 33 issuing from nozzles 34 and 35 respectively of outboard spray means 12 and 13 may have a substantially oval or elliptical shaped transverse cross section. The oval shaped transverse cross section is shown in FIG. 2a. At about the point of intersection of the converging sprays 32 and 33, a trough is provided within which the granular material 26 is initially carried. The trough carrying the granular material is shown in FIG. 2b. The "collison" of the converging, substantially circular sprays 32 and 33 issuing from the outboard spray means 12 and 13 as shown in FIG. 2c causes a resultant commingled homogeneous spray of oval shape with the granular material substantially uniformly distributed therein.

The nozzle 36 of curing agent spray means 14 emits spray pattern 37 of curing agent having an oval or elliptical shape as shown in FIG. 2A. The oval or elliptical pattern of the spray 37 of curing agent intersects the sprays of plural component material at about 5 inches from the front of the spray apparatus 10. The issuing of the curing agent spray 37 into the converging sprays of plural component material at about the locus of intersection of the sprays 32 and 33 of the outboard spray means 12 and 13 tends to trap the catalyst in the sprays of the plural component material, thus assuring an advantageous mixture of curing agent with the plural component material sprays.

Suitable additives may be introduced into the plural component material for color, ultra-violet absorption, flame-proofing and the like. Pigments may be used to achieve the desired color of the plural component material. Antimony oxide, chlorinated waxes and the like may be used to assist in flame-proofing the plural component material.

The volumn of granular material to plural component material may vary considerably. One factor to consider in determining the volumn of granular material to plural component material is the amount of irregularity or "stucco" effect desired to appear on surface 15. Using perlite, the volume of perlite to polyester resin may be about 30 to 65 volume percent perlite, the remainder polyester resin.

The thickness of the resultant coating of plural component material and granular material may be as desired. The lower limit on thickness of the coating is about 15 to 20 mils with the upper limit only limited by the economics of the situation. Generally, for coatings having good weathering characteristics, the thickness of a coating including a binder of polyester and perlite granular material should approach about 0.125 to about 0.25 of an inch or more.

The spray apparatus 10 may be hand held or carried by any suitable boom (not shown) and movable base (not shown) so as to facilitate movement of the spray apparatus across the expanse of the surface of the article to be coated.

The following example is intended to be illustrative and not limiting of depositing a plural component material and a granular material upon a substrate or article having a deposition surface of a paper-like material.

EXAMPLE

The surface of the article to be coated is spaced about 18 to 36 inches from the front of the spray apparatus 10. Polyester resin is supplied to the outboard spray means under a pressure of about 40 to 80 psi at the pump at a rate of about 1000 cc per minute through conduits about 25 feet long and having an inside diameter of about ⅜ inch. The outboard sprays converge about 5 inches in front of the spray apparatus. Undiluted methyl ethyl ketone peroxide catalyst may be used with an atomizing nozzle or it may be diluted with ethyl acetate in a ratio varying from about 1 part catalyst to 1 part ethyl acetate to about 1 part catalyst to about 3 parts ethyl acetate. The peroxide catalyst is supplied to the centrally located spray means under a pressure of about 5 to 80 psi at the pressure pot at a rate of about 55 cc per minute through a conduit about 25 feet long and having an inside diameter of about 0.25 inch. The spray of peroxide catalyst intersects the sprays of the outboard spray means about 5 inches in front of the spray apparatus. The orifice of each of the nozzles associated with the outboard spray means is oval shaped and has an opening equal to that of a circle having a diameter of about 0.2 of an inch. The orifice of the nozzle associated with the curing agent spray means is round or oval shaped and has an opening equal to a circle having a diameter of about 0.01 of an inch. Perlite granular material is supplied to the granular material emitting means at the rate of about 150 grams per minute. The perlite may be Perlite Plaster No. 210 ore manufactured by the Zonolite Division of W. R. Grace & Co. The pressure conduit 23 is about 20 psi with the length of conduit 25 being about 15 feet with an inside diameter of about 0.5 inch. The radius of the orifice of tube 20 is about 0.5 and is spaced about 1 inch above the curing agent spray means. The perlite converges with the sprays of the outboard spray means and the curing agent spray means about 2 to 3 inches in front of the spray apparatus. A polyester resin and perlite granular material of about 0.25 of an inch thick is deposited upon the surface of the article.

We claim:

1. In an apparatus for providing a spray of plural component material and curing agent with entrained granular material used to coat a surface, a spray device including
   support means,
   outboard spray means to produce a plurality of converging elongated spray patterns, said outboard spray means including a plurality of means to atomize the plural component material by hydraulic pressure mounted on said support means in such a relationship that their elongated spray patterns converge and form a trough forwardly of the support means,
   curing agent spray means mounted on the support means and positioned between the hydraulic atomizing means of the outboard spray means, the curing agent spray means including spray emitting means providing a spray of curing agent that commingles with the converging elongated sprays of plural component material, and
   granular material emitting means spaced from and above the curing agent spray means and directing the granular material into the trough formed by the elongated sprays of plural component material to commingle with the plural component material sprays from the outboard spray means whereby a spray of plural component material and curing agent with granular material is provided for coating a surface.

2. In the apparatus for providing a spray of plural component material and curing agent with entrained granular material as claimed in claim 1 wherein the granular material emitting means is spaced at least 1 inch above the outboard spray means and the curing agent spray means.

3. In the apparatus for providing an intermixed spray of plural component material and curing agent and granular material as claimed in claim 1, including means for entraining the granular material in a fluid.

4. In the apparatus for providing a spray of plural component material and curing agent with entrained granular material as claimed in claim 1 wherein the entrained granular material is projected into the sprays of plural component material at about the point at which the sprays of plural component material intersect.

* * * * *